(12) United States Patent
Mochizuki

(10) Patent No.: US 11,581,956 B2
(45) Date of Patent: Feb. 14, 2023

(54) RADIO COMMUNICATION SYSTEM, RADIO COMMUNICATION APPARATUS, RADIO COMMUNICATION METHOD, AND NON-TRANSITORY COMPUTER READABLE MEDIUM

(71) Applicant: NEC CORPORATION, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/969,043

(22) PCT Filed: Feb. 6, 2019

(86) PCT No.: PCT/JP2019/004311
§ 371 (c)(1),
(2) Date: Aug. 11, 2020

(87) PCT Pub. No.: WO2019/176388
PCT Pub. Date: Sep. 19, 2019

(65) Prior Publication Data
US 2021/0036787 A1 Feb. 4, 2021

(30) Foreign Application Priority Data
Mar. 13, 2018 (JP) .............................. JP2018-045731

(51) Int. Cl.
*H04B 17/11* (2015.01)
*H04B 17/21* (2015.01)
*H04B 17/30* (2015.01)
(52) U.S. Cl.
CPC ............. *H04B 17/11* (2015.01); *H04B 17/21* (2015.01); *H04B 17/30* (2015.01)

(58) Field of Classification Search
CPC ........ H04B 17/11; H04B 17/21; H04B 17/30; H04B 3/48; H04B 7/06; H04B 7/08; H04W 88/08
See application file for complete search history.

(56) References Cited

U.S. PATENT DOCUMENTS

| | | | | |
|---|---|---|---|---|
| 2012/0074952 | A1* | 3/2012 | Chappell | G01R 31/11 324/534 |
| 2012/0123723 | A1* | 5/2012 | El-Hassan | H04W 24/08 702/108 |

(Continued)

FOREIGN PATENT DOCUMENTS

| | | |
|---|---|---|
| JP | 2016-122895 A | 7/2016 |
| JP | 2017-195463 A | 10/2017 |
| WO | 2012/096101 A1 | 7/2012 |

OTHER PUBLICATIONS

Daisuke Nose, et al., Development and Basic Characteristics of Low-SHF-Band Massive Element Active Antenna System for 5G, IEICE Technical Report, Feb. 22, 2017, 9 pages, vol. 116, No. 479, RCS2016-310.

(Continued)

*Primary Examiner* — Derrick V Rose
(74) *Attorney, Agent, or Firm* — Sughrue Mion, PLLC

(57) ABSTRACT

One of a plurality of radio communication apparatuses (100) becomes a master apparatus (100-M), and a rest of them become slave apparatuses (100-S). The master apparatus and each of the slave apparatus includes a plurality of transceivers (31) each composed of a transmitter and a receiver and first ports (55 and 56). The master apparatus further includes a calibration transceiver (51). The first port of the master apparatus is connected to the first port of the slave apparatus via an RF cable. When transmission calibration is performed, each transmitter of the slave apparatus transmits a transmission calibration signal to the calibration (Continued)

transceiver of the master apparatus via the RF cable. When reception calibration is performed, the calibration transceiver of the master apparatus transmits a reception calibration signal to each receiver of the slave apparatus via the RF cable.

10 Claims, 11 Drawing Sheets

(56) References Cited

U.S. PATENT DOCUMENTS

| 2014/0242914 A1* | 8/2014 | Monroe | H04B 17/21 |
| | | | 455/63.4 |
| 2016/0020817 A1* | 1/2016 | Chen | H04B 17/12 |
| | | | 370/278 |
| 2016/0254870 A1* | 9/2016 | O'Keeffe | H01Q 3/267 |
| | | | 455/67.14 |
| 2017/0085005 A1 | 3/2017 | Aue et al. | |

OTHER PUBLICATIONS

International Search Report for PCT/JP2019/004311 dated Mar. 26, 2019 [PCT/ISA/210].

Written Opinion for PCT/JP2019/004311 dated Mar. 26, 2019 [PCT/ISA/237].

\* cited by examiner

RADIO COMMUNICATION SYSTEM, RADIO COMMUNICATION APPARATUS, RADIO COMMUNICATION METHOD, AND NON-TRANSITORY COMPUTER READABLE MEDIUM

CROSS REFERENCE TO RELATED APPLICATIONS

This application is a National Stage of International Application No. PCT/JP2019/004311 filed Feb. 6, 2019, claiming priority based on Japanese Patent Application No. 2018-045731 filed Mar. 13, 2018, the entire disclosure of which is incorporated herein.

TECHNICAL FIELD

The present disclosure relates to a radio communication system, a radio communication apparatus, a radio communication method, and a non-transitory computer readable medium.

BACKGROUND ART

The techniques for increasing the capacity of a radio communication system include MU-MIMO (Multi User-Multi Input Multi Output) in which a base station uses a plurality of antennas to simultaneously communicate with a plurality of terminals.

When MU-MIMO is performed, a base station performs beamforming to control the directivity of a beam emitted from an antenna. In beamforming, directivity in the direction of a desired wave to a specified terminal among terminals that perform spatial multiplexing is enhanced, and Null is generated in the direction of the other terminals to prevent an interference beam to the other terminals.

In the meantime, recently, the use of an AAS (Active Antenna System) for a base station has been studied (see, for example, Patent Literature 1). The AAS incorporates a plurality of antennas and a plurality of transceivers corresponding to the plurality of respective antennas. The use of the AAS for a base station has an advantage of miniaturization of the base station and so on.

In the AAS, the accuracy of beamforming deteriorates when there are variations in the amplitudes and phases of the incorporated transceivers. Therefore, in the AAS, calibration is performed in order to compensate for variations in the amplitudes and phases of the respective incorporated transceivers.

CITATION LIST

Patent Literature

Patent Literature 1: Japanese Unexamined Patent Application Publication No. 2017-195463

SUMMARY OF INVENTION

Technical Problem

Incidentally, some radio communication systems require an extension of a reachable distance and a coverage depending on the actual environment characteristics, the number of terminals, communication demand, etc. A possible way to meet this request is to improve the transmission/reception performance by operating a plurality of AASs and improving the degree of freedom for generating Null while MU-MIMO is performed, thereby extending the spatial multiplexing order and the direction of multiplexing and extending a transmission distance between respective terminals at the time of spatial multiplexing. In this case, an AAS incorporating the basic number of transceivers is defined as a minimum configuration unit, and a plurality of the AASs are connected in cascade to optimally support individual cases.

However, when a plurality of AASs are provided, there is a problem that it is necessary to compensate for variations in amplitudes and phases of the respective transceivers even between AASs, in addition to compensating for variations in amplitudes and phases of the respective transceivers within one AAS.

An object of the present disclosure to provide a radio communication system, a radio communication apparatus, a radio communication method, and a non-temporary computer readable medium that can solve the above problem and compensate for variations in amplitudes and phases of respective transceivers of a plurality of radio communication apparatuses.

Solution to Problem

An example aspect is a radio communication system including:
a plurality of radio communication apparatuses.
One of the plurality of radio communication apparatuses becomes a master apparatus, and a rest of the radio communication apparatuses become slave apparatuses,
the master apparatus and each of the slave apparatus includes:
   a plurality of transceivers each composed of a transmitter and a receiver; and
   a first port connected to another radio communication apparatus via an RF (Radio Frequency) cable,
the master apparatus further includes a calibration transceiver,
the first port of the master apparatus is connected to the first port of the slave apparatus via the RF cable,
when transmission calibration is performed, each transmitter of the slave apparatus is configured to transmit a transmission calibration signal to the calibration transceiver of the master apparatus via the RF cable, and
when reception calibration is performed, the calibration transceiver of the master apparatus is configured to transmit a reception calibration signal to each receiver of the slave apparatus via the RF cable.

Another example aspect is a radio communication apparatus among a plurality of radio communication apparatuses, one of which becomes a master apparatus, and a rest of which become slave apparatuses. The radio communication apparatus includes:
a plurality of transceivers each composed of a transmitter and a receiver;
a first port connected to another radio communication apparatus via an RF (Radio Frequency) cable; and
a calibration transceiver.
In a situation where the radio communication apparatus becomes the master apparatus, the first port of the radio communication apparatus is connected to the first port of the slave apparatus via the RF cable,
in a situation where the radio communication apparatus becomes the slave apparatus, the first port of the radio communication apparatus is connected to the first port of the master apparatus via the RF cable, when transmission calibration is performed in a situation where the radio communication apparatus becomes the slave apparatus, each transmitter is configured to transmit a transmission calibration signal to the calibration transceiver of the master apparatus via the RF cable, and when reception calibration is performed in a situation where the radio communication apparatus becomes the master apparatus, the calibration transceiver is configured to transmit a reception calibration signal to each receiver of the slave apparatus via the RF cable.

Another example aspect is a radio communication method performed by one radio communication apparatus among a plurality of radio communication apparatuses, one of which becomes a master apparatus, and a rest of which become slave apparatuses, the radio communication apparatus including a plurality of transceivers each composed of a transmitter and a receiver. The radio communication method includes:

connecting the radio communication apparatus to the slave apparatus via an RF (Radio Frequency) cable in a situation where the radio communication apparatus becomes the master apparatus;

connecting the radio communication apparatus to the master apparatus via the RF cable in a situation where the radio communication apparatus becomes the slave apparatus;

transmitting a transmission calibration signal from each transmitter to the master apparatus via the RF cable when transmission calibration is performed in a situation where the radio communication apparatus becomes the slave apparatus; and transmitting a reception calibration signal to each receiver of the slave apparatus via the RF cable when reception calibration is performed in a situation where the radio communication apparatus becomes the master apparatus.

Another example aspect is a non-transitory computer readable medium storing a program for causing one radio communication apparatus among a plurality of radio communication apparatuses, one of which becomes a master apparatus, and a rest of which become slave apparatuses to execute a radio communication method, the radio communication apparatus including a plurality of transceivers each composed of a transmitter and a receiver. The program includes.

a procedure of connecting the radio communication apparatus to the master apparatus via an RF (Radio Frequency) cable in a situation where the radio communication apparatus becomes the slave apparatus;

a procedure of connecting the master apparatus to the slave apparatus via the RF cable in a situation where the radio communication apparatus becomes the master apparatus;

a procedure of transmitting a transmission calibration signal from each transmitter to the master apparatus via the RF cable when transmission calibration is performed in a situation where the radio communication apparatus becomes the slave apparatus; and a procedure of transmitting a reception calibration signal to each receiver of the slave apparatus via the RF cable when reception calibration is performed in a situation where the radio communication apparatus becomes the master apparatus.

Advantageous Effects of Invention

According to the above example aspects, it is possible to achieve an effect that a radio communication system, a radio communication apparatus, a radio communication method, and a non-temporary computer readable medium that can compensate for variations in amplitudes and phases of respective transceivers of a plurality of radio communication apparatuses can be provided.

DESCRIPTION OF EMBODIMENTS

Hereinafter, example embodiments of the present disclosure will be described with reference to the drawings. The following descriptions and drawings have been appropriately omitted and simplified in order to clarify the descriptions. In the following drawings, the same elements are denoted by the same reference signs, and repeated description is omitted as necessary.

(1) First Example Embodiment

A first example embodiment is an example of a radio communication system including two AASs. When a radio communication system includes two AASs, one of them becomes a master AAS, and the other becomes a slave AAS. Although it is possible to freely set which one of the two AASs to become the master AAS by controlling each AAS from the outside, it is assumed here that the master AAS has already been controlled and set.

Figure 1:
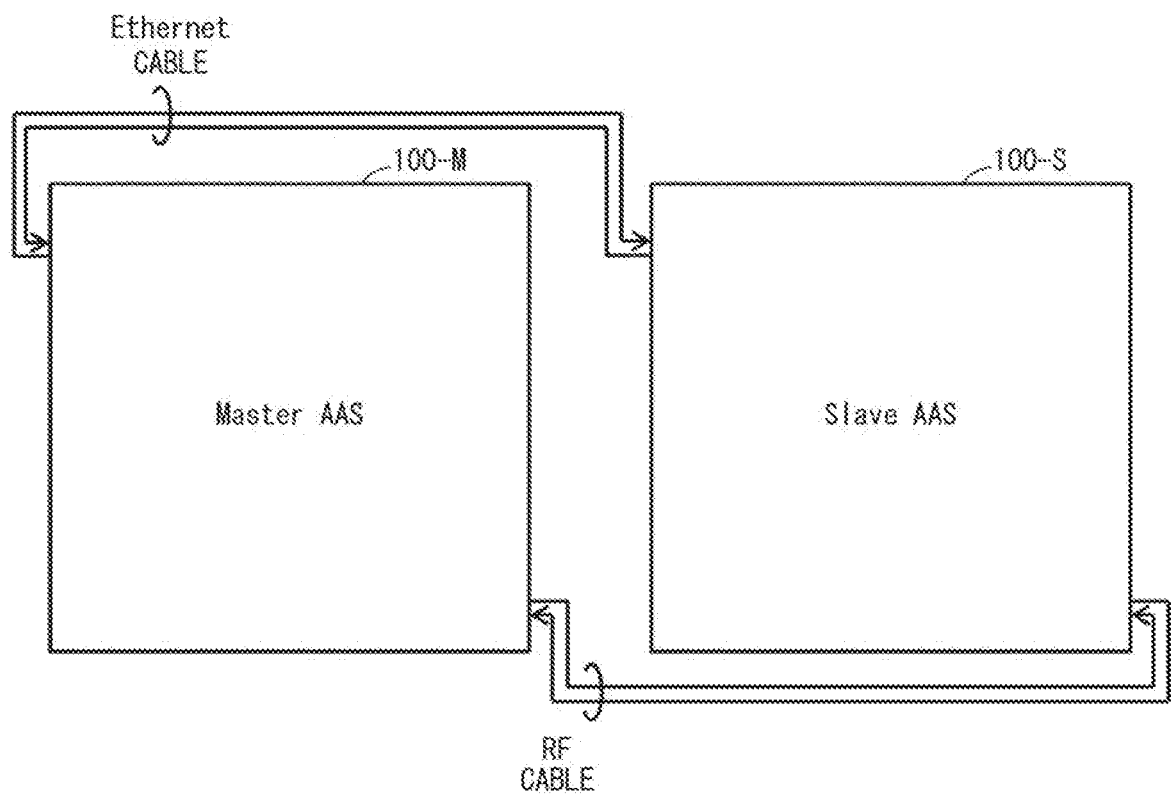
FIG. 1 shows an example of a configuration of a radio communication system according to a first example embodiment.

First, a configuration of the radio communication system according to the first example embodiment will be described. FIG. 1 shows an example of a configuration of the radio communication system according to the first example embodiment.

As shown in FIG. 1, the radio communication system according to the first example embodiment includes one master AAS 100-M and one slave AAS 100-S. Hereinafter, the term "AAS 100" is used to refer to both the master AAS 100-M and the slave AAS 100-S. The AAS 100 is an example of a radio communication apparatus, the master AAS 100-M is an example of a master apparatus, and the slave AAS 100-S is an example of a slave apparatus.

The master AAS 100-M collectively performs transmission calibration and reception calibration for compensating for variations in amplitudes and phases of respective transceivers of the master AAS 100-M and the slave AAS 100-S.

In the radio communication system according to the first example embodiment, it is assumed that the master AAS 100-M and the slave AAS 100-S are used for base stations. Thus, the master AAS 100-M performs DL (Downlink) calibration (may be referred to as DL CAL in the drawings) as transmission calibration and UL (Uplink) calibration (may be referred to as UL CAL in the drawings) as reception calibration.

The master AAS 100-M and the slave AAS 100-S are connected by RF (Radio Frequency) cables. The RF cable is a high-frequency cable, a coaxial cable, a waveguide, or the like. Thus, when the DL calibration is performed, a DL calibration signal (RF signal), which is a transmission calibration signal, can be transmitted from each transmitter of the slave AAS 100-S to the master AAS 100-M via the RF cable. When the UL calibration is performed, a UL calibration signal (RF signal), which is a reception calibration signal, can be transmitted from the master AAS 100-M to each receiver of the slave AAS 100-S via the RF cable.

The master AAS 100-M and the slave AAS 100-S are connected also by Ethernet (registered trademark) cables. The Ethernet cable is an example of a network cable. Between the master AAS 100-M and the slave AAS 100-S, a result of performing the DL calibration (weight to compensate for variations in amplitudes and phases of the respective transmitters), a result of performing the UL calibration (weight to compensate for variations in amplitudes and phases of the respective receivers), reception information of the UL calibration signal of the slave AAS 100-S during the UL calibration, and so on are transmitted and received via the Ethernet cables.

Figure 2:
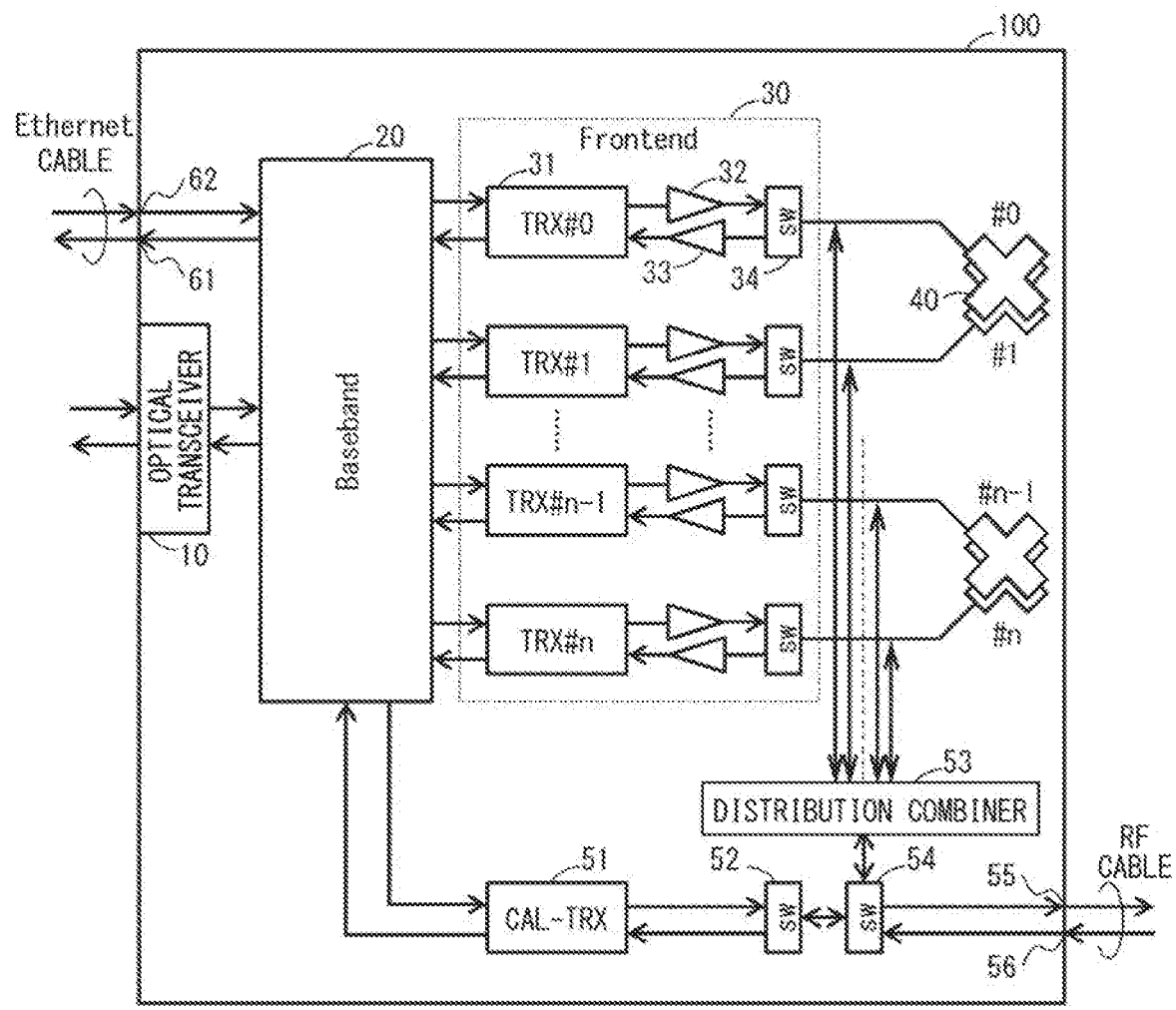
FIG. 2 is a circuit diagram showing an example of a configuration of an AAS according to the first example embodiment.

Next, configurations of the master AAS 100-M and the slave AAS 100-S according to the first example embodiment will be described. Since the configurations of the master AAS 100-M and the slave AAS 100-S are the same, they will be described as the configuration of the AAS 100. FIG. 2 is a circuit diagram showing an example of the configuration of the AAS 100 according to the first example embodiment.

As shown in FIG. 2, the AAS 100 according to the first example embodiment includes an optical transceiver 10, a baseband (BB) unit 20, a frontend unit 30, and a plurality ((n+1) where n is a natural number equal to or greater than 1) of antennas 40. The frontend unit 30 includes a plurality (n+1) of transceivers (TRX) 31, a plurality (n+1) of transmission amplifiers 32, a plurality (n+1) of reception amplifiers 33, and a plurality (n+1) of switches (SW) 34 corresponding to the antennas 40, respectively. Each transceiver 31 includes a transmitter (hereinafter referred to as a transmitter TX) and a receiver (hereinafter referred to as a receiver RX), both of which are not shown. The AAS 100 according to the first example embodiment further includes a calibration transceiver (CAL-TRX) 51, switches (SW) 52 and 54, and a distribution combiner 53. The AAS 100 according to the first example embodiment further includes an RF output port 55, an RF input port 56, an Ethernet output port 61, and an Ethernet input port 62.

The RF output port 55 is connected to the RF input port 56 of another AAS 100 via an RF cable. The RF input port 56 is connected to the RF output port 55 of another AAS 100 via an RF cable. Specifically, the RF output port 55 of the master AAS 100-M is connected to the RF input port 56 of the slave AAS 100-S, and the RF input port 56 of the master AAS 100-M is connected to the RF output port 55 of the slave AAS 100-S. The RF output port 55 and the RF input port 56 are examples of first ports.

The Ethernet output port 61 is connected to the Ethernet input port 62 of another AAS 100 via an Ethernet cable. The Ethernet input port 62 is connected to the Ethernet output port 61 of another AAS 100 via an Ethernet cable. Specifically, the Ethernet output port 61 of the master AAS 100-M is connected to the Ethernet input port 62 of the slave AAS 100-S, and the Ethernet input port 62 of the master AAS 100-M is connected to the Ethernet output port 61 of the slave AAS 100-S. The Ethernet output port 61 and the Ethernet input port 62 are examples of second ports.

The optical transceiver 10 performs photoelectric conversion and reverse conversion of photoelectric conversion on signals transmitted and received between an optical transmission line (not shown) and the baseband unit 20.

When the DL calibration is performed, the baseband unit 20 outputs a DL calibration signal IQ (IQ signal) to each transmitter TX. The baseband unit 20 outputs a UL calibration signal IQ (IQ signal) to the calibration transceiver 51 when the UL calibration is performed in a situation where the AAS 100, in which this baseband unit 20 is included, is the master AAS 100-M. The baseband unit 20 is an example of a control unit.

As described above, the transceiver 31 includes the transmitter TX and the receiver RX (not shown). When the DL calibration is performed, the transmitter TX converts the DL calibration signal IQ (IQ signal) output from the baseband unit 20 into a DL calibration signal (RF signal), and transmits the converted DL calibration signal. When the UL calibration is performed, the receiver RX receives the UL calibration signal (RF signal), converts the received UL calibration signal into a UL calibration signal IQ (IQ signal), and outputs the converted UL calibration signal IQ to the baseband unit 20.

The transmission amplifier 32 amplifies the DL calibration signal when the DL calibration is performed. The reception amplifier 33 amplifies the UL calibration signal when the UL calibration is performed.

The switch 34 is a switch for switching a signal direction. When the DL calibration is performed, the switch 34 outputs the DL calibration signal output from the transmission amplifier 32 to the distribution combiner 53. When the UL calibration is performed, the switch 34 outputs the UL calibration signal output from the distribution combiner 53 to the reception amplifier 33.

When the DL calibration is performed, the distribution combiner 53 combines the DL calibration signals output from the switches 34 and outputs the combined DL calibration signal to the switch 54. When the UL calibration is performed, the distribution combiner 53 distributes the UL calibration signal output from the switch 54 and outputs the distributed UL calibration signal to each switch 34.

The switch 54 is a switch for switching a signal direction. The switch 54 outputs the DL calibration signal output from the distribution combiner 53 and the RF input port 56 to the switch 52 when the DL calibration is performed in a situation where the AAS 100, in which this switch 54 is included, is the master AAS 100-M. The switch 54 outputs the DL calibration signal output from the distribution combiner 53 to the RF output port 55 when the DL calibration is performed in a situation where the AAS 100, in which this switch 54 is included, is the slave AAS 100-S. The switch 54 outputs the UL calibration signal output from the switch 52 to the distribution combiner 53 and the RF output port 55 when the UL calibration is performed in a situation where the AAS 100, in which this switch 54 is included, is the master AAS 100-M. The switch 54 outputs the DL calibration signal output from the RF input port 56 to the distribution combiner 53 when the UL calibration is performed in a situation where the AAS 100, in which this switch 54 is included, is the slave AAS 100-S.

The switch 52 is a switch for switching a signal direction. The switch 52 outputs the DL calibration signal output from the switch 54 to the calibration transceiver 51 when the DL calibration is performed in a situation where the AAS 100, in which this switch 52 is included, is the master AAS 100-M. The switch 52 outputs the UL calibration signal output from the calibration transceiver 51 to the switch 54 when the UL calibration is performed in a situation where the AAS 100, in which this switch 52 is included, is the master AAS 100-M.

When the DL calibration is performed, the calibration transceiver 51 converts the DL calibration signal (RF signal) output from the switch 52 into a DL calibration signal IQ (IQ signal) and outputs the converted DL calibration signal IQ to the baseband unit 20. When the UL calibration is performed, the calibration transceiver 51 converts the UL calibration signal IQ (IQ signal) output from the baseband unit 20 into a UL calibration signal (RF signal), and outputs the converted UL calibration signal to the switch 52. Like the transceiver 31, the calibration transceiver 51 may include a transmitter and a receiver.

The baseband unit 20 calculates a weight for compensating for variations in amplitudes and phases of the respective transmitters TX of the master AAS 100-M and the slave AAS 100-S when the DL calibration is performed in a situation where the AAS 100, in which this baseband unit 20 is included, is the master AAS 100-M. The baseband unit 20 transmits the weight of each transmitter TX of the slave AAS 100-S to the slave AAS 100-S via the Ethernet output port 61.

The baseband unit 20 calculates a weight for compensating for variations in amplitudes and phases of the respective receivers RX of the master AAS 100-M and the slave AAS 100-S when the UL calibration is performed in a situation where the AAS 100, in which this baseband unit 20 is included, is the master AAS 100-M. The baseband unit 20 transmits the weight of each receiver RX of the slave AAS 100-S to the slave AAS 100-S via the Ethernet output port 61.

Hereinafter, the DL calibration operation and the UL calibration operation of the radio communication system according to the first example embodiment will be described.

<DL Calibration Operation>

Figure 3:
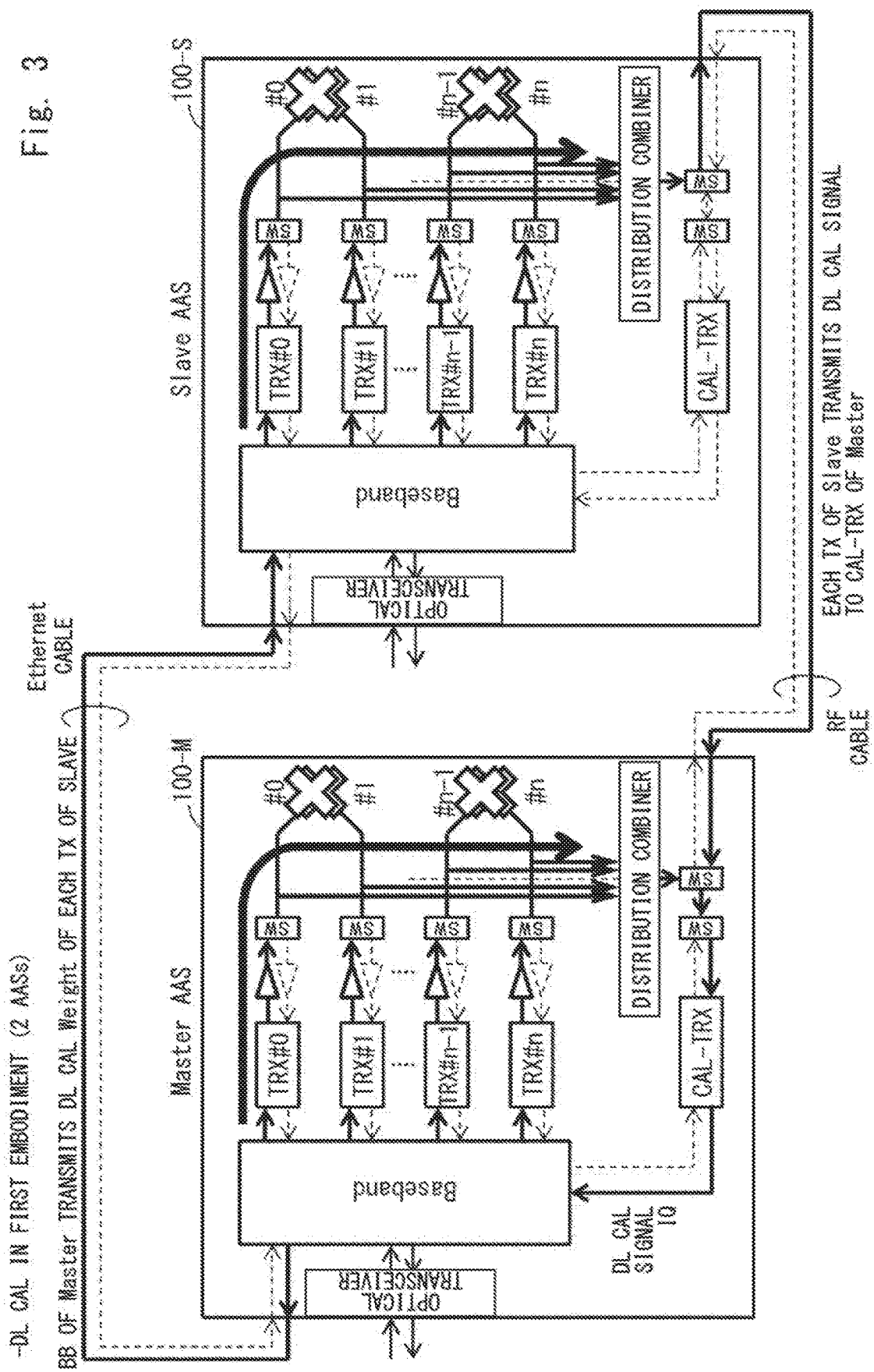
FIG. 3 is a diagram for explaining an example of a DL calibration operation of the radio communication system according to the first example embodiment.
Figure 4:
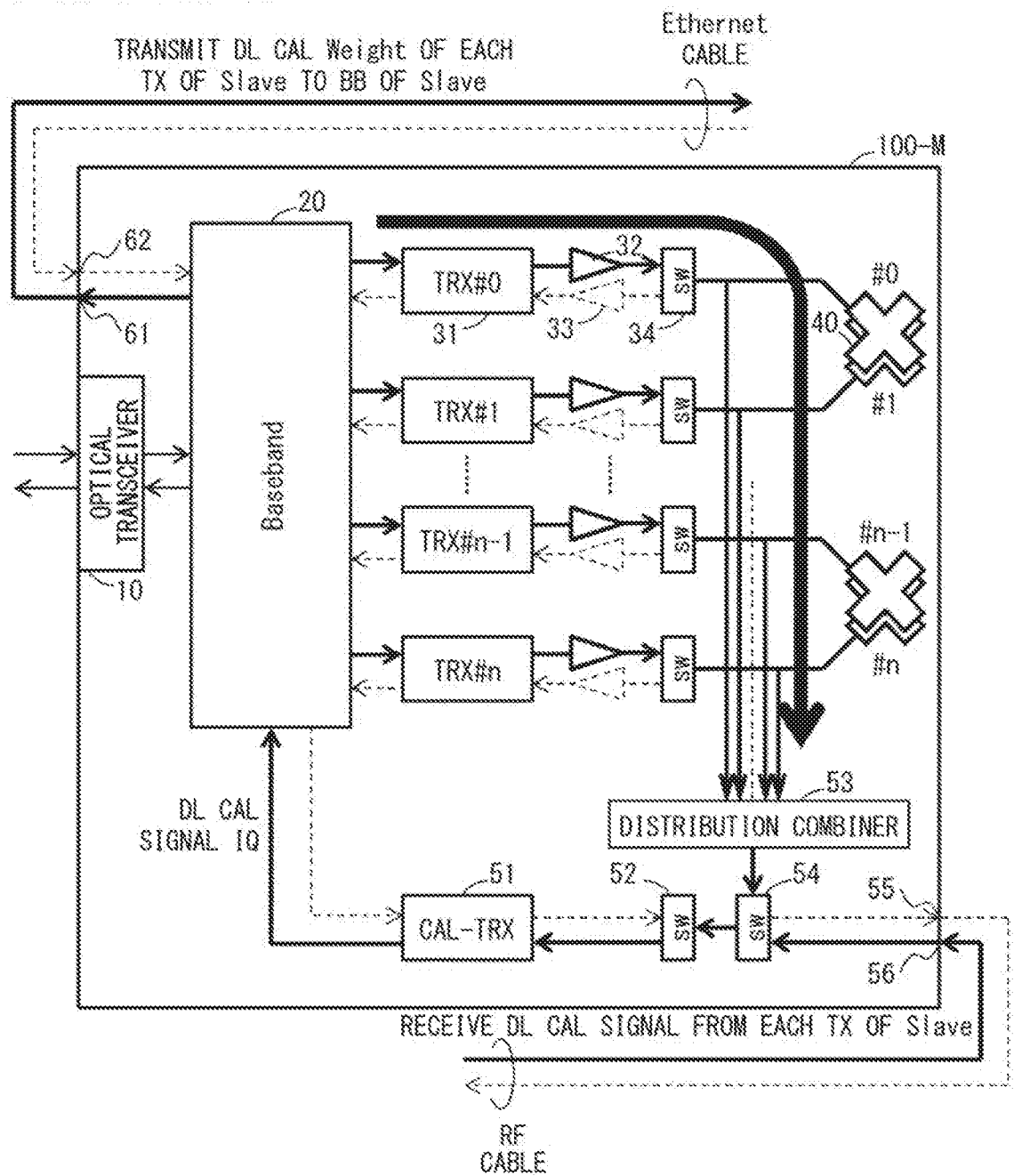
FIG. 4 is a diagram for explaining an example of a DL calibration operation of a master AAS according to the first example embodiment.
Figure 5:
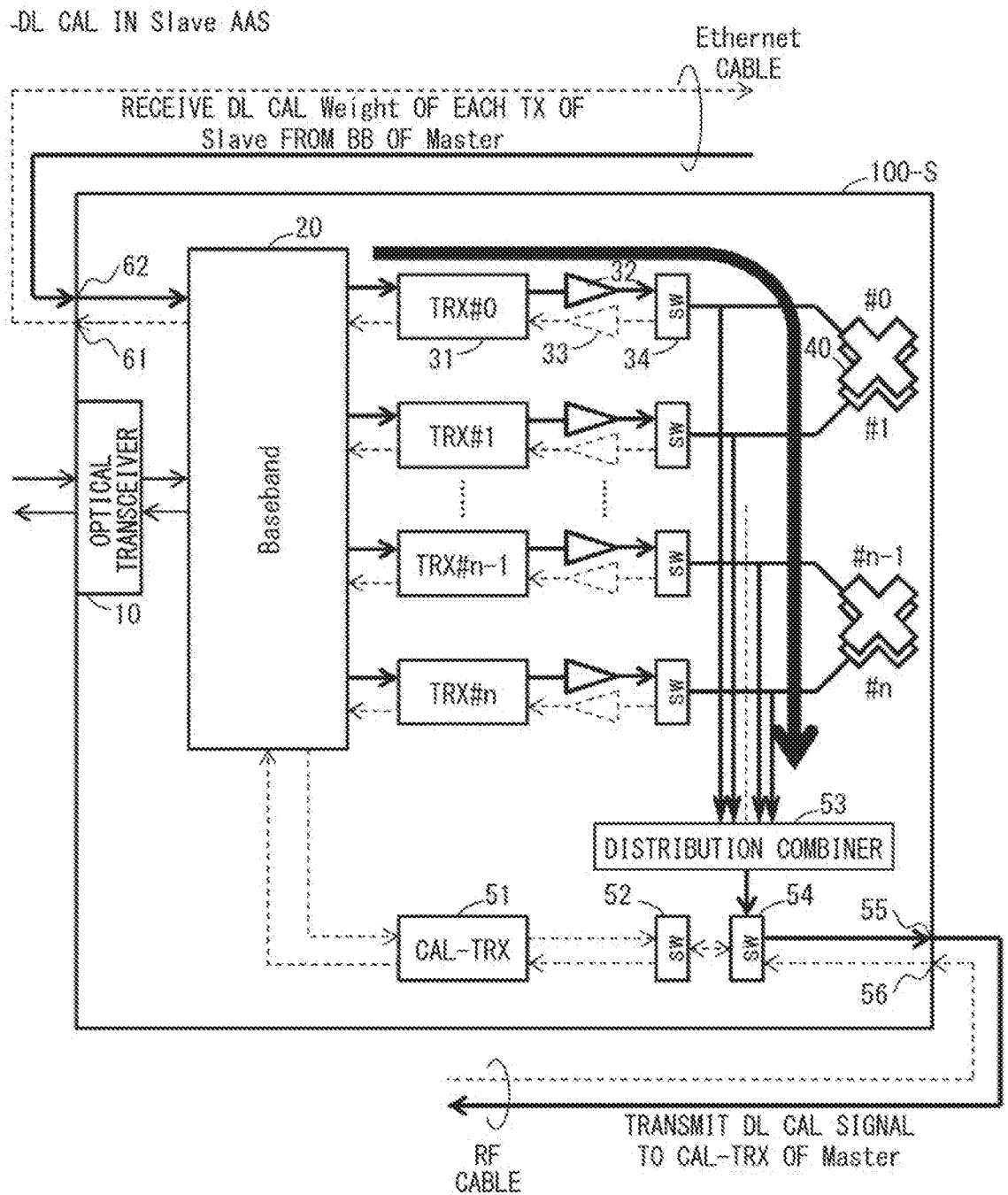
FIG. 5 is a diagram for explaining an example of a DL calibration operation of a slave AAS according to the first example embodiment.

First, the DL calibration operation will be described. FIG. 3 is a diagram for explaining an example of the DL calibration operation of the radio communication system according to the first example embodiment. FIG. 4 is a diagram for explaining an example of the DL calibration operation of the master AAS 100-M according to the first example embodiment. FIG. 5 is a diagram for explaining an example of the DL calibration operation of the slave AAS 100-S according to the first example embodiment. It is assumed that a common DL calibration signal IQ is preset in the master AAS 100-M and the slave AAS 100-S.

As shown in FIGS. 3 to 5, in the master AAS 100-M, the baseband unit 20 outputs the preset DL calibration signal IQ to each transmitter TX. Each transmitter TX converts the DL calibration signal IQ into a DL calibration signal. The DL calibration signal converted by each transmitter TX is output to the distribution combiner 53 via the transmission amplifier 32 and the switch 34, and is combined by the distribution combiner 53. The DL calibration signal combined by the distribution combiner 53 is output to the calibration transceiver 51 via the switches 54 and 52.

On the other hand, also in the slave AAS 100-S, the baseband unit 20 outputs a preset DL calibration signal IQ to each transmitter TX. Each transmitter TX converts the DL calibration signal IQ into a DL calibration signal. The DL calibration signal converted by each transmitter TX is output to the distribution combiner 53 via the transmission amplifier 32 and the switch 34, and is combined by the distribution combiner 53. The DL calibration signal combined by the distribution combiner 53 is transmitted to the master AAS 100-M via the switch 54 and the RF output port 55.

In the master AAS 100-M, the DL calibration signal transmitted from the slave AAS 100-S is input from the RF input port 56 and output to the calibration transceiver 51 via the switches 54 and 52. As described above, the calibration transceiver 51 of the master AAS 100-M is provided with the DL calibration signals transmitted from all the transmitters TX of the master AAS 100-M and the slave AAS 100-S. The calibration transceiver 51 converts the DL calibration signal into the DL calibration signal IQ and outputs it to the baseband unit 20. The baseband unit (20) learns variations in amplitudes and phases of the DL calibration signals transmitted from the transmitters (TX) of the master AAS 100-M and the slave AAS 100-S by measuring a difference between an amplitude and a phase of the DL calibration signal (IQ) of the DL calibration signals transmitted from the transmitters (TX) of the master AAS 100-M and the slave AAS 100-S and those of an original DL calibration signal (IQ). The baseband unit 20 calculates the weights of the transmitters TX of the master AAS 100-M and the slave AAS 100-S based on a result of the learning. The baseband unit 20 transmits the weight of each transmitter TX of the slave AAS 100-S to the slave AAS 100-S via the Ethernet output port 61.

The DL calibration operation is thus completed.

After that, in a normal DL operation, the baseband unit 20 of the master AAS 100-M outputs the DL signal IQ weighted by the weight calculated by the baseband unit 20 of the master AAS-100M itself for the transmitter TX to the corresponding transmitter TX of the master AAS 100-M.

On the other hand, the baseband unit 20 of the slave AAS 100-S outputs the DL signal IQ weighted by the weight calculated by the baseband unit 20 of the master AAS 100-M for the transmitter TX to the corresponding transmitter TX of the slave AAS 100-S.

<UL Calibration Operation>

Figure 6:
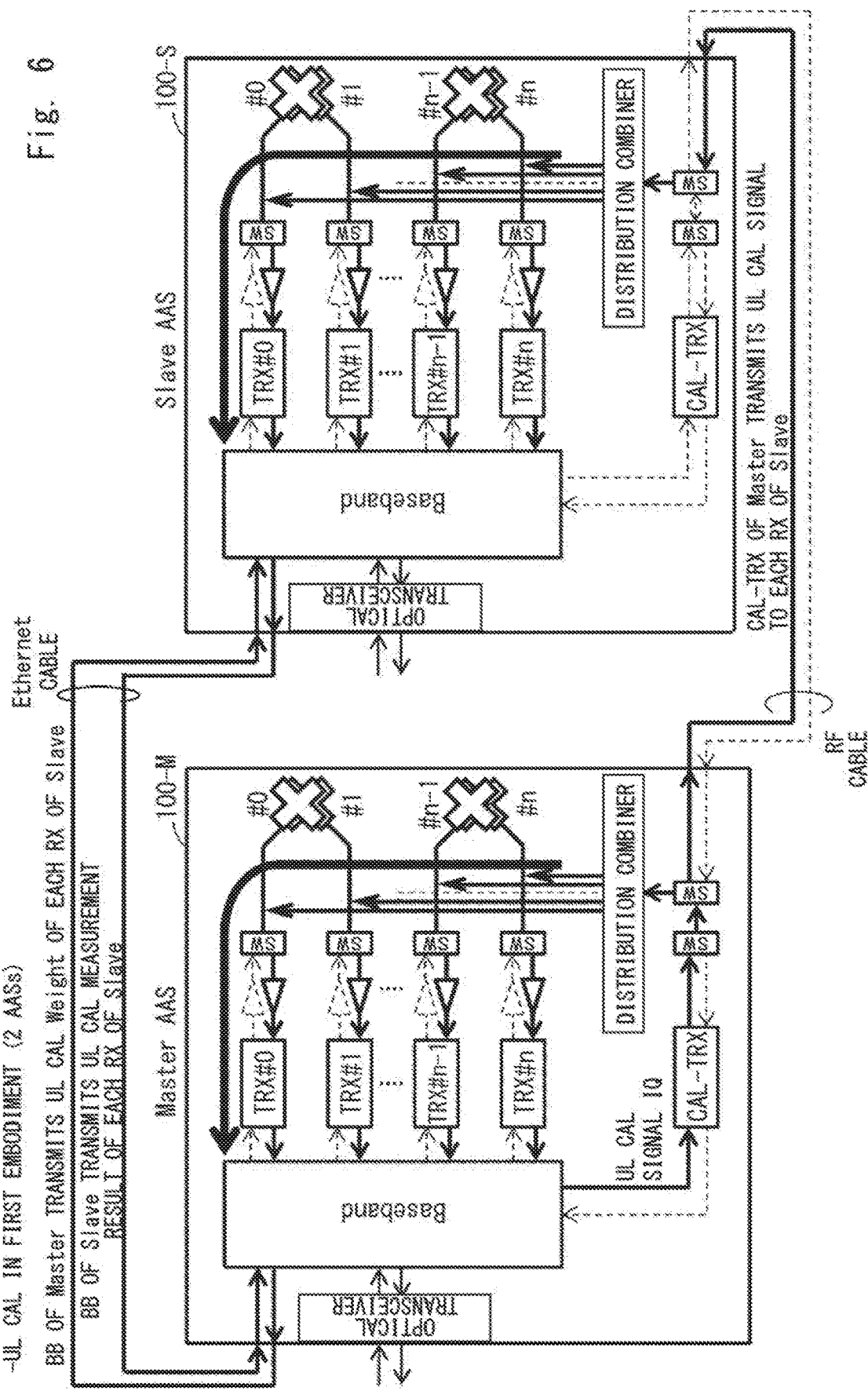
FIG. 6 is a diagram for explaining an example of the UL calibration operation of the radio communication system according to the first example embodiment.
Figure 7:
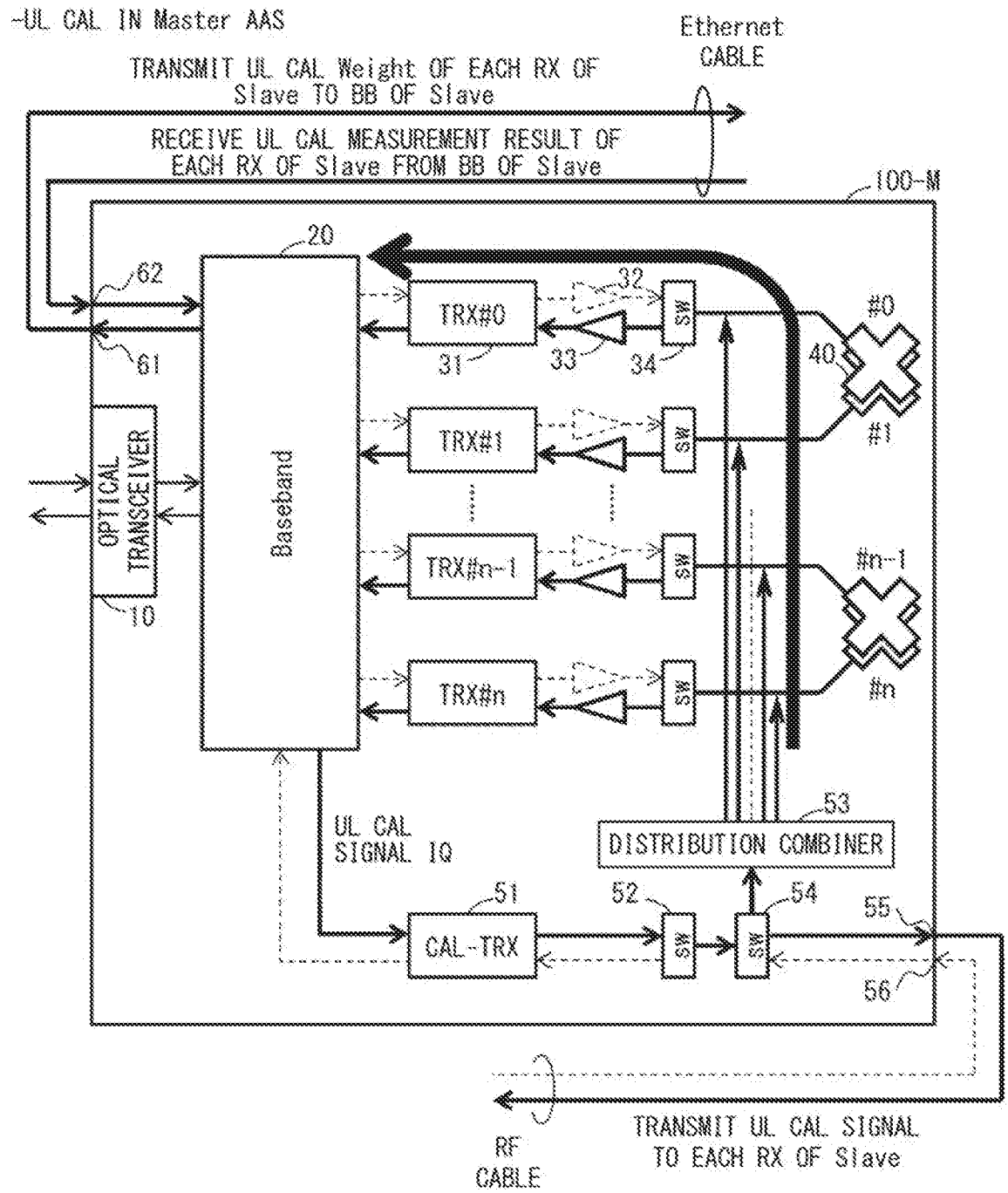
FIG. 7 is a diagram for explaining an example of the UL calibration operation of the master AAS according to the first example embodiment.
Figure 8:
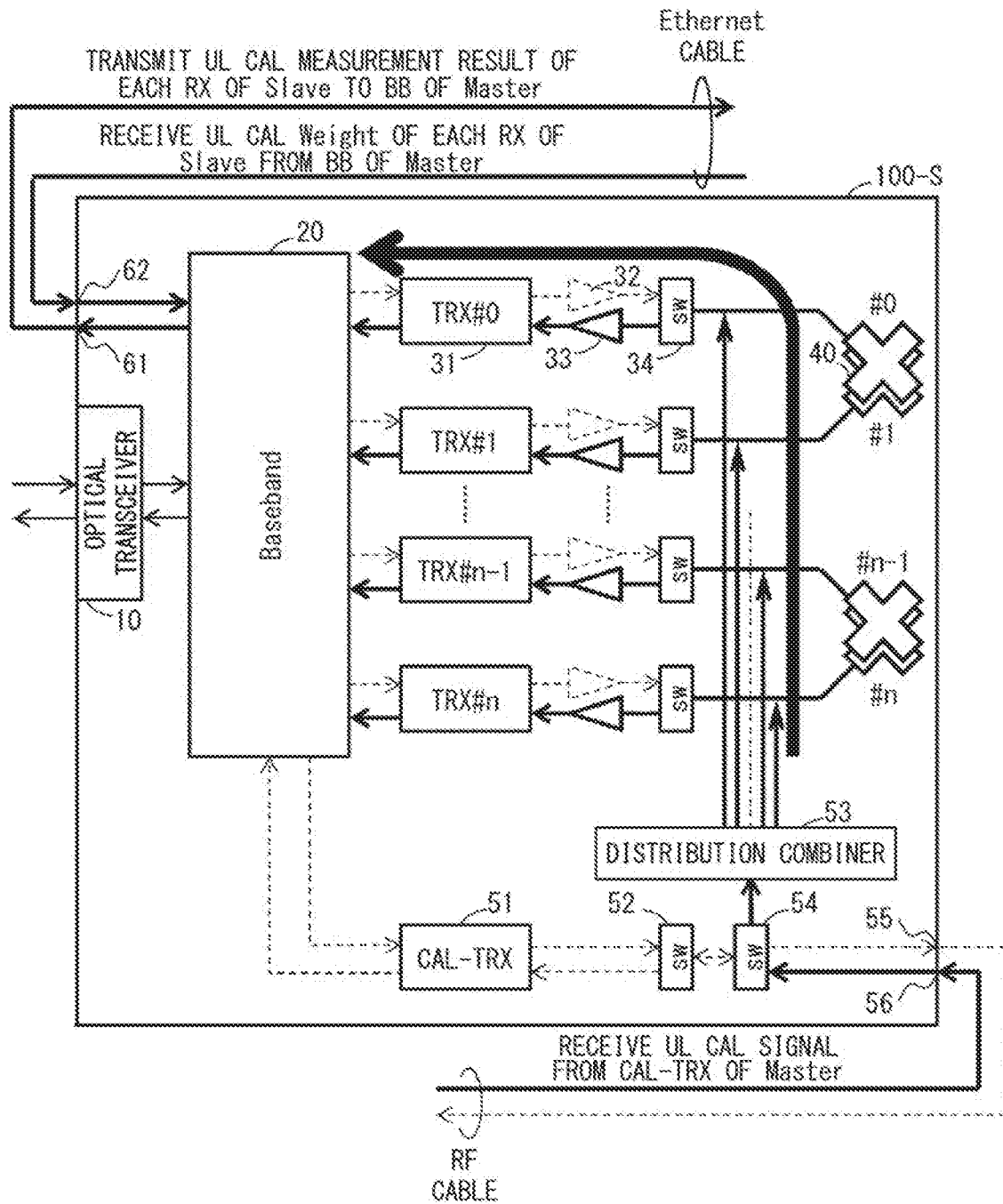
FIG. 8 is a diagram for explaining an example of the UL calibration operation of the slave AAS according to the first example embodiment.

Next, the UL calibration operation will be described. FIG. 6 is a diagram for explaining an example of the UL calibration operation of the radio communication system according to the first example embodiment. FIG. 7 is a diagram for explaining an example of the UL calibration operation of the master AAS 100-M according to the first example embodiment. FIG. 8 is a diagram for explaining an example of the UL calibration operation of the slave AAS 100-S according to the first example embodiment. Note that it is assumed that a common UL calibration signal IQ is preset in the master AAS 100-M and the slave AAS 100-S.

As shown in FIGS. 6 to 8, in the master AAS 100-M, the baseband unit 20 outputs the preset UL calibration signal IQ to the calibration transceiver 51. The calibration transceiver 51 converts the UL calibration signal IQ into the UL calibration signal. The UL calibration signal converted by the calibration transceiver 51 is output to the distribution combiner 53 via the switches 52 and 54 and distributed by the distribution combiner 53. The UL calibration signal distributed by the distribution combiner 53 is output to each receiver RX via the switch 34 and the reception amplifier 33. Each receiver RX converts the UL calibration signal into the UL calibration signal IQ and outputs it to the baseband unit 20. The baseband unit 20 measures the difference between the amplitude and phase of the UL calibration signal IQ of the UL calibration signal received by each receiver RX and those of the original UL calibration signal IQ. The UL calibration signal converted by the calibration transceiver 51 is also transmitted to the slave AAS 100-S via the switches 52 and 54 and the RF output port 55.

On the other hand, in the slave AAS 100-S, the UL calibration signal transmitted from the master AAS 100-M is input from the RF input port 56, output to the distribution combiner 53 via the switch 54, and distributed by the distribution combiner 53. The UL calibration signal distributed by the distribution combiner 53 is output to each receiver RX via the switch 34 and the reception amplifier 33. Each receiver RX converts the UL calibration signal into the UL calibration signal IQ and outputs it to the baseband unit 20. The baseband unit 20 measures the difference between the amplitude and phase of the UL calibration signal IQ of the UL calibration signal received by each receiver RX and those of the original UL calibration signal IQ. A result of the measurement is transmitted to the master AAS 100-M via the Ethernet output port 61 as the UL calibration measurement result.

In the master AAS 100-M, the UL calibration measurement result of each receiver RX of the slave AAS 100-S transmitted from the slave AAS 100-S is input from the Ethernet input port 62 and output to the baseband unit 20. As described above, the baseband unit 20 is provided with the UL calibration measurement results of all the receivers RX of the master AAS 100-M and the slave AAS 100-S. The baseband unit 20 learns variations in the amplitudes and phases of the UL calibration signals received by the receivers RX of the master AAS 100-M and the slave AAS 100-S based on the UL calibration measurement results. The baseband unit 20 calculates a weight of each receiver RX of the master AAS 100-M and the slave AAS 100-S based on a result of the learning. The baseband unit 20 transmits the weight of each receiver RX of the slave AAS 100-S to the slave AAS 100-S via the Ethernet output port 61.

The UL calibration operation is thus completed.

After that, in a normal UL operation, the baseband unit 20 of the master AAS 100-M weights the UL signal IQ output from each of the receivers RX of the master AAS 100-M by the weight calculated by the baseband unit 20 of the master AAS 100-M itself for the corresponding receiver RX.

On the other hand, the baseband unit 20 of the slave AAS 100-S weights the UL signal IQ output from each receiver RX of the slave AAS 100-S by the weight calculated by the baseband unit 20 of the master AAS 100-M for the corresponding receiver RX.

As described above, according to the first example embodiment, one of the two AAS 100 becomes the master AAS 100-M and the other becomes the slave AAS 100-S, and the master AAS 100-M and the slave AAS 100-S are connected via the RF cable. When the DL calibration is performed, a DL calibration signal used for the DL calibration is transmitted from each transmitter TX of the slave AAS 100-S to the calibration transceiver 51 of the master AAS 100-M via the RF cable. When the UL calibration is performed, a UL calibration signal used for the UL calibration is transmitted from the calibration transceiver 51 of the master AAS 100-M to each receiver RX of the slave AAS 100-S via the RF cable.

Thus, when the DL calibration is performed, a DL calibration signal is transmitted from each transmitter TX of the slave AAS 100-S, and the DL calibration signal can be received by the calibration transceiver 51 of the master AAS 100-M.

When the UL calibration is performed, a UL calibration signal is transmitted from the calibration transceiver 51 of the master AAS 100-M, and the UL calibration signal can be received by each receiver RX of the slave AAS 100-S.

Thus, the DL calibration of the respective transmitters TX of the master AAS 100-M and the slave AAS 100-S can be performed collectively, and the UL calibration of the respective receivers RX of the respective transmitters TX of the master AAS 100-M and the slave AAS 100-S can be performed collectively. This enables compensation for variations in amplitudes and phases of the respective transceivers 31 of the master AAS 100-M and the slave AAS 100-S.

(2) Second Example Embodiment

A second example embodiment is an example of a radio communication system including three or more AASs. When a radio communication system includes three or more AASs, one of them becomes a master AAS and the other two or more become slave AASs. Although it is possible to freely set which one of the three or more AASs to become the master AAS by controlling each AAS from the outside in a manner similar to when there are two AASs, it is assumed here that the master AAS has already been controlled and set.

Figure 9:
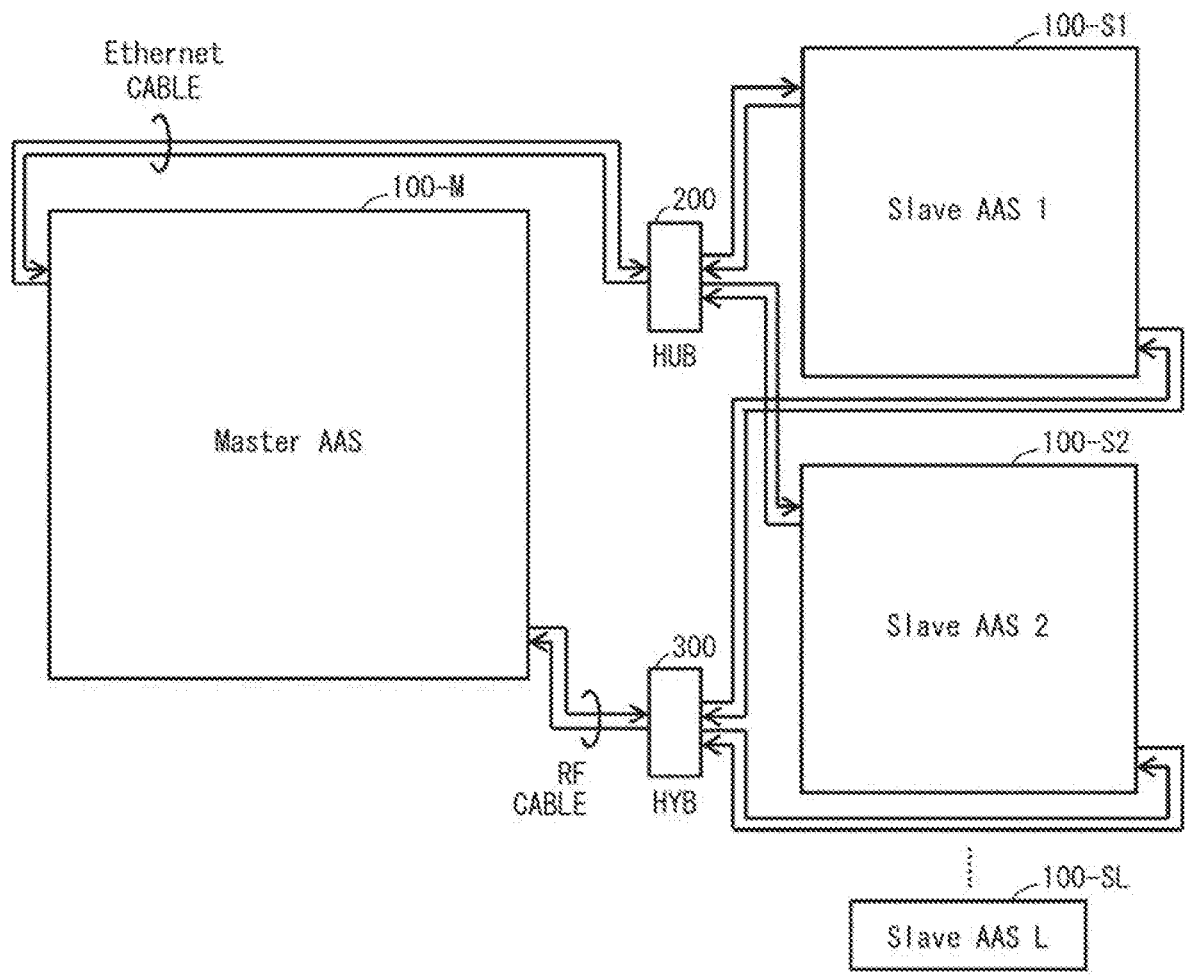
FIG. 9 shows an example of a configuration of a radio communication system according to a second example embodiment.

First, a configuration of the radio communication system according to the second example embodiment will be described. FIG. 9 shows an example of the configuration of the radio communication system according to the second example embodiment.

As shown in FIG. 9, the radio communication system according to the second example embodiment differs from the radio communication system according to the first example embodiment in that, in the radio communication system according to the second embodiment, a plurality (L where L is a natural number equal to or greater than 2) of slave AASs 100-S1 to 100-SL are included as slave AAS 100-S, and a hub (HUB) 200 and a hybrid (HYB) 300 are further added.

The hybrid 300 is connected to the RF output port 55 and the RF input port 56 of the master AAS 100-M via RF cables, and is connected to the RF output port 55 and the RF input port 56 of each of the slave AASs 100-S1 to 100-SL via an RF cable. The hybrid 300 is an example of a first distribution combiner.

The hub 200 is connected to the Ethernet output port 61 and the Ethernet input port 62 of the master AAS 100-M via Ethernet cables, and is connected to the Ethernet output port 61 and the Ethernet input port 62 of each of the slave AASs 100-S1 to 100-SL via Ethernet cables. The hub 200 is an example of a second distribution combiner.

In the second example embodiment, a configuration according to the second example embodiment other than the above components is the same as that according to the first example embodiment.

Hereinafter, the DL calibration operation and the UL calibration operation of the radio communication system according to the second example embodiment will be described.

<DL Calibration Operation>

Figure 10:
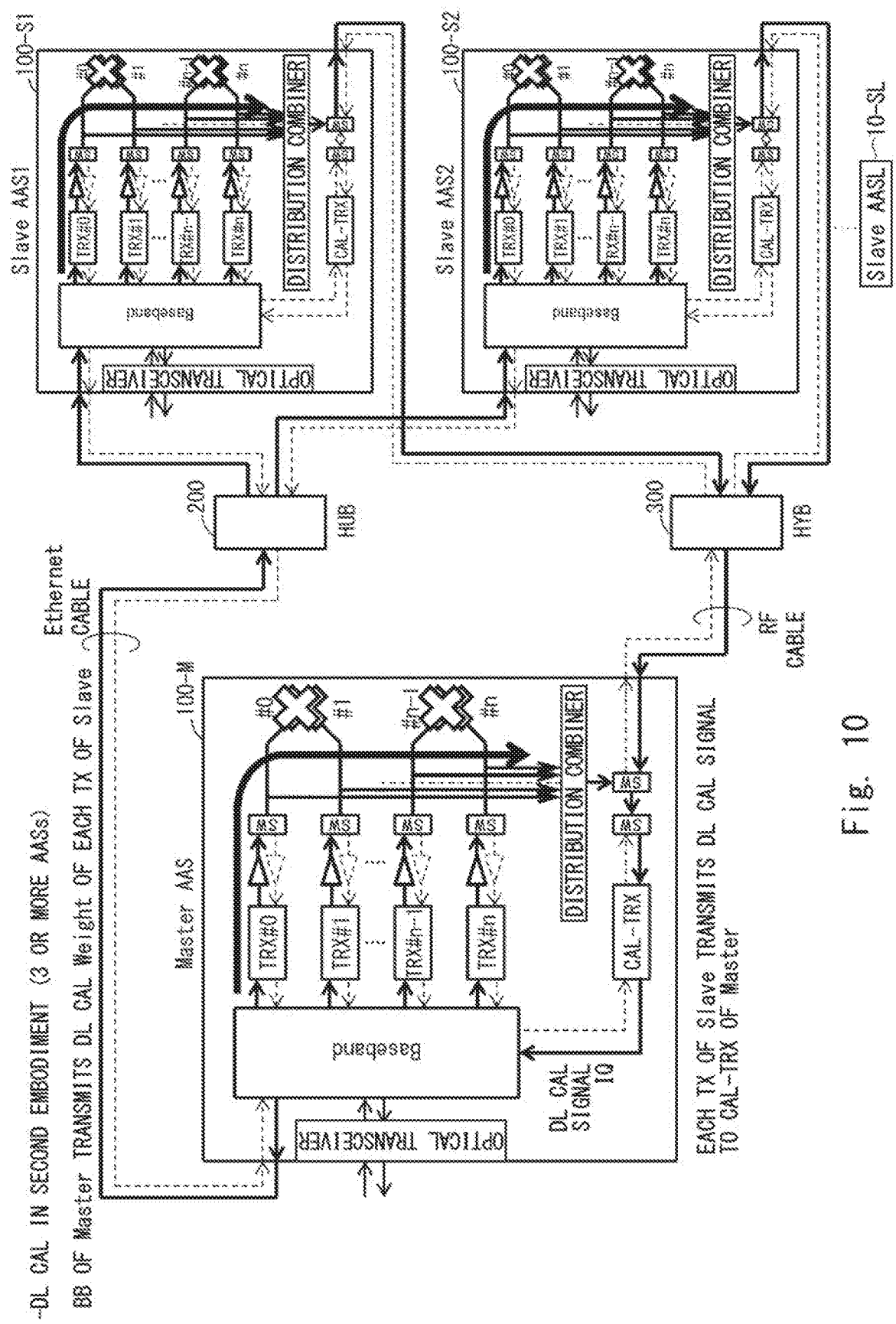
FIG. 10 is a diagram for explaining an example of the DL calibration operation of the radio communication system according to the second example embodiment.

First, the DL calibration operation will be described. FIG. 10 is a diagram for explaining an example of the DL calibration operation of the radio communication system according to the second example embodiment. Note that the DL calibration operations of the master AAS 100-M and each of the slave AASs 100-S1 to 100-SL according to the second example embodiment are the same as those shown in FIGS. 4 and 5, respectively. It is assumed that a common DL calibration signal IQ is preset in the master AAS 100-M and the slave AASs 100-S1 to 100-SL.

As shown in FIGS. 10, 4, and 5, in the master AAS 100-M, the baseband unit 20 outputs the preset DL calibration signal IQ to each transmitter TX. Each transmitter TX converts the DL calibration signal IQ into a DL calibration signal. The DL calibration signal converted by each transmitter TX is output to the distribution combiner 53 via the transmission amplifier 32 and the switch 34, and is combined by the distribution combiner 53. The DL calibration signal combined by the distribution combiner 53 is output to the calibration transceiver 51 via the switches 54 and 52.

On the other hand, also in the slave AAS 100-S1, the baseband unit 20 outputs a preset DL calibration signal IQ to each transmitter TX. Each transmitter TX converts a DL calibration signal IQ into a DL calibration signal. The DL calibration signal converted by each transmitter TX is output to the distribution combiner 53 via the transmission amplifier 32 and the switch 34, and is combined by the distribution combiner 53. The DL calibration signal combined by the distribution combiner 53 is transmitted to the master AAS 100-M via the switch 54 and the RF output port 55.

Also in the slave AASs 100-S2 to 100-SL, the above-described same operation as in the slave AAS 100-S1 is performed.

In the master AAS 100-M, the DL calibration signal transmitted from each of the slave AASs 100-S1 to 100-SL is input from the RF input port 56 and output to the calibration transceiver 51 via the switches 54 and 52. As described above, the calibration transceiver 51 of the master AAS 100-M is provided with the DL calibration signals transmitted from all the transmitters TX of the master AAS 100-M and the slave AASs 100-S1 to 100-SL. The calibration transceiver 51 converts the DL calibration signal into the DL calibration signal IQ and outputs it to the baseband unit 20. The baseband unit (20) learns variations in amplitudes and phases of the DL calibration signals transmitted from the transmitters (TX) of the master AAS 100-M and the slave AASs 100-S1 to 100-SL by measuring differences in an amplitude and a phase of the DL calibration signal (IQ) of the DL calibration signals transmitted from the transmitters (TX) of the master AAS 100-M and the slave AASs 100-S1 to 100-SL and those of an original DL calibration signal (IQ). The baseband unit 20 calculates the weights of the transmitters TX of the master AAS 100-M and the slave AASs 100-S1 to 100-SL based on a result of the learning. The baseband unit 20 transmits the weight of each transmitter TX of the slave AASs 100-S to the slave AASs 100-S1 to 100-SL via the Ethernet output port 61.

The DL calibration operation is thus completed.

After that, in a normal DL operation, the baseband unit 20 of the master AAS 100-M outputs the DL signal IQ weighted by the weight calculated by the baseband unit 20 of the master AAS 100-M itself for the transmitter TX to the corresponding transmitter TX of the master AAS 100-M.

On the other hand, each baseband unit 20 of the slave AAS 100-S1 to 100-SL outputs the DL signal IQ weighted by the weight calculated by the baseband unit 20 of the master AAS 100-M for the transmitter TX to the corresponding transmitter TX of the slave AASs 100-S1 to 100-SL.

<UL Calibration Operation>

Figure 11:
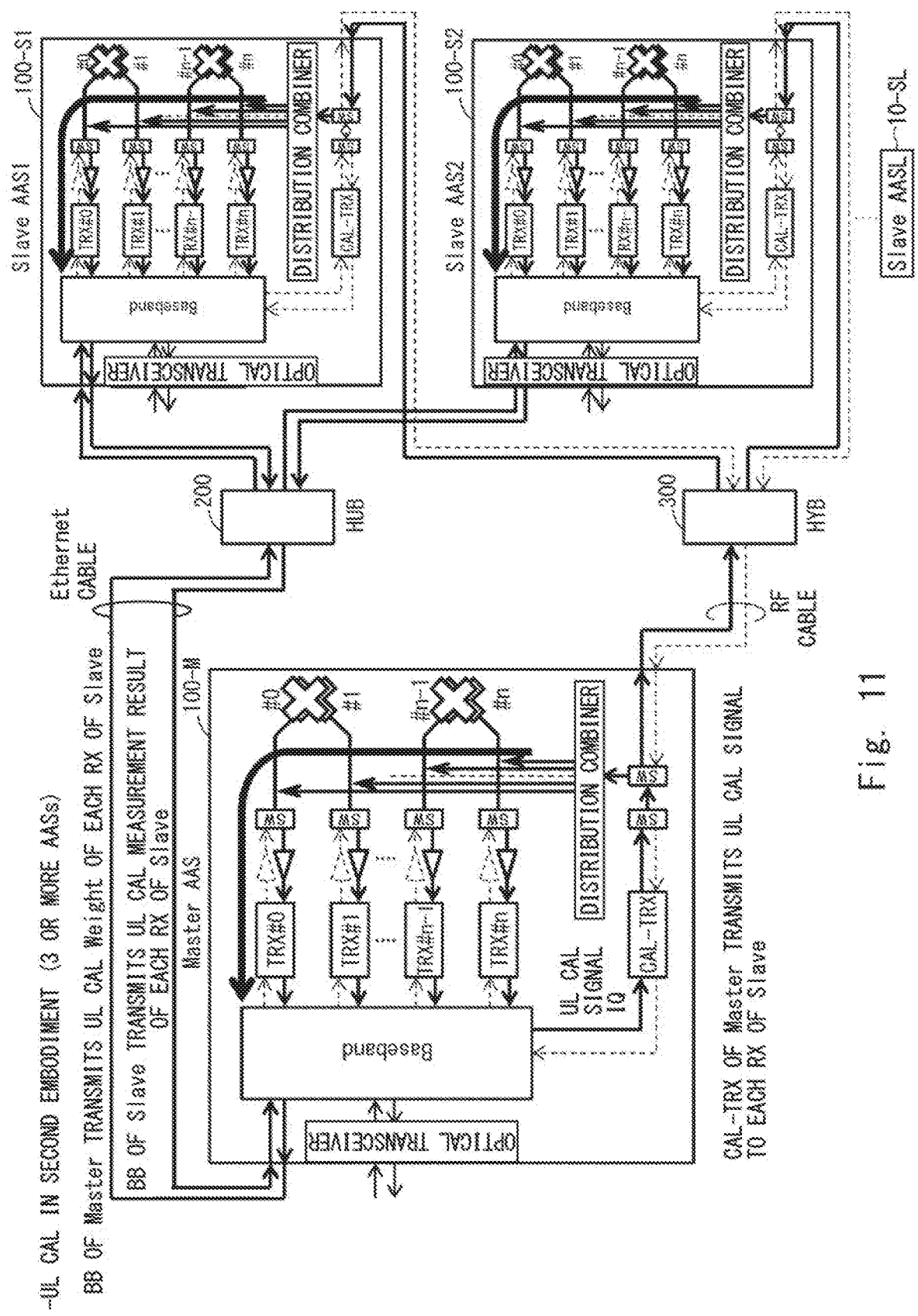
FIG. 11 is a diagram for explaining an example of the UL calibration operation of the radio communication system according to the second example embodiment.

Next, the UL calibration operation will be described. FIG. 11 is a diagram for explaining an example of the UL calibration operation of the radio communication system according to the second example embodiment. Note that the UL calibration operations of the master AAS 100-M and each of the slave AASs 100-S1 to 100-SL according to the second example embodiment are the same as those shown in FIGS. 7 and 8, respectively. It is assumed that a common UL calibration signal IQ is preset in the master AAS 100-M and the slave AASs 100-S1 to 100-SL.

As shown in FIGS. 11, 7, and 8, in the master AAS 100-M, the baseband unit 20 outputs the preset UL calibration signal IQ to the calibration transceiver 51. The calibration transceiver 51 converts the UL calibration signal IQ into the UL calibration signal. The UL calibration signal converted by the calibration transceiver 51 is output to the distribution combiner 53 via the switches 52 and 54 and distributed by the distribution combiner 53. The UL calibration signal distributed by the distribution combiner 53 is output to each receiver RX via the switch 34 and the reception amplifier 33. Each receiver RX converts the UL calibration signal into the UL calibration signal IQ and outputs it to the baseband unit 20. The baseband unit 20 measures the difference between the amplitude and phase of the UL calibration signal IQ of the UL calibration signal received by each receiver RX and those of the original UL calibration signal IQ. The UL calibration signal converted by the calibration transceiver 51 is also transmitted to each of the slave AASs 100-S1 to 100-SL via the switches 52 and 54 and the RF output port 55.

On the other hand, in the slave AAS 100-S1, the UL calibration signal transmitted from the master AAS 100-M is input from the RF input port 56, output to the distribution combiner 53 via the switch 54, and distributed by the distribution combiner 53. The UL calibration signal distributed by the distribution combiner 53 is output to each receiver RX via the switch 34 and the reception amplifier 33. Each receiver RX converts the UL calibration signal into the UL calibration signal IQ and outputs it to the baseband unit 20. The baseband unit 20 measures the difference between the amplitude and phase of the UL calibration signal IQ of the UL calibration signal received by each receiver RX and those of the original UL calibration signal IQ. A result of the measurement is transmitted to the master AAS 100-M via the Ethernet output port 61 as the UL calibration measurement result.

Also in the slave AASs 100-S2 to 100-SL, the same operation as in the slave AAS 100-S1 is performed.

In the master AAS 100-M, the UL calibration measurement result of each receiver RX of the slave AAS 100-S transmitted from each of the slave AASs 100-S1 to 100-SL is input from the Ethernet input port 62 and output to the baseband unit 20. As described above, the baseband unit 20 is provided with the UL calibration measurement results of all the receivers RX of the master AAS 100-M and the slave AASs 100-S1 to 100-SL. The baseband unit 20 learns variations in the amplitude and phase of the UL calibration signals received by the receivers RX of the master AAS 100-M and the slave AASs 100-S1 to 100-SL based on the UL calibration measurement results. The baseband unit 20 calculates a weight of each receiver RX of the master AAS 100-M and the slave AAS 100-S1 to 100-SL based on a result of the learning. The baseband unit 20 transmits the weight of each receiver RX of the slave AASs 100-S1 to 100-SL to the corresponding slave AASs 100-S1 to 100-SL via the Ethernet output port 61.

The UL calibration operation is thus completed.

After that, in a normal UL operation, the baseband unit 20 of the master AAS 100-M weights the UL signal IQ output from each of the receivers RX of the master AAS 100-M by the weight calculated by the baseband unit 20 of the master AAS 100-M itself for the corresponding receiver RX.

On the other hand, each baseband unit 20 of the slave AASs 100-S1 to 100-SL weights the UL signal IQ output from each receiver RX of the corresponding AAS 100-S by the weight calculated by the baseband unit 20 of the master AAS 100-M for the corresponding receiver RX.

As described above, according to the second example embodiment, one of the three or more AASs 100 becomes the master AAS 100-M and the other two or more become the slave AASs 100-S1 to 100-SL, the RF output port 55 and the RF input port 56 of the master AAS 100-M are connected to the hybrid 300 via the RF cables, and the RF output port 55 and the RF input port 56 of each of the slave AASs 100-S1 to 100-SL are connected to the hybrid 300 via the RF cables. The individual DL calibration operations and UL calibration operations of the master AAS 100-M and the slave AASs 100-S1 to 100-SL are the same as those in the first example embodiment.

Therefore, even when there are two or more slave AASs 100-S1 to 100-SLs, the DL calibration of the respective transmitters TX of the master AAS 100-M and the slave AASs 100-S1 to 100-SL can be performed collectively, and the UL calibration of the respective receivers RX of the master AAS 100-M and the slave AASs 100-S1 to 100-SL can be performed collectively. This enables compensation for variations in amplitudes and phases of the respective transceivers 31 of the master AAS 100-M and the slave AASs 100-S1 to 100-SLs.

Although the present disclosure has been described with reference to the example embodiments, the present disclosure is not limited to the example embodiments described above. Various modifications may be made to the configurations and details of the present disclosure within the scope understood by those skilled in the art.

For example, in the above example embodiment, although the master AAS and the slave AAS are connected via two RF cables and two Ethernet cables for transmission and reception, the present disclosure is not limited to this. In the present disclosure, the master AAS may be connected to the slave AAS via one RF cable and one Ethernet cable commonly used for transmission and reception.

In the above example embodiments, although Ethernet cables are used for connection between the master AAS and the slave AAS, the present disclosure is not limited to this. Any network cable that can transmit digital signals may be used in the present disclosure. The network cable is a high-speed serial transmission line or the like.

Further, in the above example embodiments, when there are a plurality of slave AASs, the master AAS and the plurality of slave AASs are connected via a hub and a hybrid. However, the present disclosure is not limited to this. In the present disclosure, a master AAS may be connected to a plurality of slave AASs in a row.

In the above example embodiments, although the master AAS and the slave AAS have the same configuration, the present disclosure is not limited to this. When the AAS is used only as the slave AAS, the calibration transceiver 51 and the switch 52 are not needed. For this reason, in the present disclosure, the calibration transceiver 51 and the switch 52 may be removed from the AAS that is used only as the slave AAS.

Further, according to the present disclosure, the AASs may be disposed adjacent to each other or may be disposed separately from each other.

Although the AAS of the present disclosure has been described as a hardware configuration in the above example embodiments, the present disclosure is not limited to this. The present disclosure can also be achieved by causing a processor such as a CPU (Central Processing Unit) to execute a computer program for specified processing of the AAS.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the embodiments disclosed above can be described as, but not limited to, the following supplementary notes.

(Supplementary Note 1)

A radio communication system comprising:

a plurality of radio communication apparatuses, wherein one of the plurality of radio communication apparatuses becomes a master apparatus, and a rest of the radio communication apparatuses become slave apparatuses, the master apparatus and each of the slave apparatus comprises:

a plurality of transceivers each composed of a transmitter and a receiver; and a first port connected to another radio communication apparatus via an RF (Radio Frequency) cable, the master apparatus further comprises a calibration transceiver, the first port of the master apparatus is connected to the first port of the slave apparatus via the RF cable, when transmission calibration is performed, each transmitter of the slave apparatus is configured to transmit a transmission calibration signal to the calibration transceiver of the master apparatus via the RF cable, and when reception calibration is performed, the calibration transceiver of the master apparatus is configured to transmit a reception calibration signal to each receiver of the slave apparatus via the RF cable.

(Supplementary Note 2)

The radio communication system according to Supplementary note 1, wherein the master apparatus and each of the slave apparatus further comprises:

a second port connected to another radio communication apparatus via a network cable; and a control unit, wherein the second port of the master apparatus is connected to the second port of the slave apparatus via the network cable, when transmission calibration is performed, the calibration transceiver of the master apparatus is configured to receive the transmission calibration signal transmitted via the RF cable from each transmitter of the slave apparatus and receive the transmission calibration signal transmitted from each transmitter of the master apparatus, and the control unit of the master apparatus is configured to measure a difference between an amplitude and a phase of the transmission calibration signal transmitted from each transmitter of the master apparatus and the slave apparatus and those of an original transmission calibration signal, calculate a weight of each transmitter of the master apparatus and the slave apparatus based on a result of the measurement, and transmit the weight of each transmitter of the slave apparatus to the control unit of the slave apparatus via the network cable.

(Supplementary Note 3)

The radio communication system according to Supplementary note 2, wherein when the reception calibration is performed, the calibration transceiver of the master apparatus is configured to transmit the reception calibration signal also to each receiver of the master apparatus, the control unit of the slave apparatus is configured to measure a difference between an amplitude and a phase of the reception calibration signal received by each receiver of the slave apparatus and those of an original reception calibration signal and transmit a result of the measurement to the control unit of the master apparatus via the network cable, and the control unit of the master apparatus is configured to measure a difference between an amplitude and a phase of the reception calibration signal received by each receiver of the master apparatus and those of an original reception calibration signal, calculate a weight of each transmitter of the master apparatus and the slave apparatus based on a result of the measurement on the reception calibration signal received by each receiver of the master apparatus and the result of the measurement on the reception calibration signal received by each receiver of the slave apparatus, and transmit the weight of each transmitter of the slave apparatus to the control unit of the slave apparatus via the network cable.

(Supplementary Note 4)

The radio communication system according to Supplementary note 2 or 3, further comprising:

a first distribution combiner; and a second distribution combiner, wherein when there are three or more of the radio communication apparatuses and a plurality of the slave apparatuses, the first port of the master apparatus is connected to the first distribution combiner via the RF cable, and the first port of each of the plurality of the slave apparatuses is connected to the first distribution combiner via the RF cable, and the second port of the master apparatus is connected to the second distribution combiner via the network cable, and the second port of each of the plurality of the slave apparatuses is connected to the second distribution combiner via the network cable.

(Supplementary Note 5)

A radio communication apparatus among a plurality of radio communication apparatuses, one of which becomes a master apparatus, and a rest of which become slave apparatuses, the radio communication apparatus comprising:

a plurality of transceivers each composed of a transmitter and a receiver;

a first port connected to another radio communication apparatus via an RF (Radio Frequency) cable; and a calibration transceiver, wherein in a situation where the radio communication apparatus becomes the master apparatus, the first port of the radio communication apparatus is connected to the first port of the slave apparatus via the RF cable, in a situation where the radio communication apparatus becomes the slave apparatus, the first port of the radio communication apparatus is connected to the first port of the master apparatus via the RF cable, when transmission calibration is performed in a situation where the radio communication apparatus becomes the slave apparatus, each transmitter is configured to transmit a transmission calibration signal to the calibration transceiver of the master apparatus via the RF cable, and when reception calibration is performed in a situation where the radio communication apparatus becomes the master apparatus, the calibration transceiver is configured to transmit a reception calibration signal to each receiver of the slave apparatus via the RF cable.

(Supplementary note 6)

The radio communication apparatus according to Supplementary note 5, further comprising:

a second port connected to another radio communication apparatus via a network cable; and a control unit, wherein in a situation where the radio communication apparatus becomes the master apparatus, the second port of the radio communication apparatus is connected to the second port of the slave apparatus via the network cable, in a situation where the radio communication apparatus becomes the slave apparatus, the second port of the radio communication apparatus is connected to the second port of the master apparatus via the network cable, and when the transmission calibration is performed in a situation where the radio communication apparatus becomes the master apparatus, the calibration transceiver is configured to receive the transmission calibration signal transmitted from each transmitter of the slave apparatus via the RF cable and receive the transmission calibration signal transmitted from each transmitter of the master apparatus, the control unit is configured to measure a difference between an amplitude and a phase of the transmission calibration signal transmitted from each transmitter of the master apparatus and the slave apparatus and those of an original transmission calibration signal, calculate a weight of each transmitter of the master apparatus and the slave apparatus based on a result of the measurement, and transmit the weight of each transmitter of the slave apparatus to the control unit of the slave apparatus via the network cable.

(Supplementary Note 7)

The radio communication apparatus according to Supplementary note 6, wherein when the reception calibration is performed in a situation where the radio communication apparatus becomes the master apparatus, the calibration transceiver is configured to transmit the reception calibration signal also to each receiver of the master apparatus, when the reception calibration is performed in a situation where the radio communication apparatus becomes the slave apparatus, the control unit is configured to measure a difference between an amplitude and a phase of the reception calibration signal received by each receiver of the slave apparatus and those of an original reception signal and transmit a result of the measurement to the control unit of the master apparatus via the network cable, and when the reception calibration is performed in a situation where the radio communication apparatus becomes the master apparatus, the control unit is configured to measure a difference between an amplitude and a phase of the reception calibration signal received by each receiver of the master apparatus and those of an original reception calibration signal, calculate a weight of each transmitter of the master apparatus and the slave apparatus based on a result of the measurement on the reception calibration signal received by each receiver of the master apparatus and the result of the measurement on the reception calibration signal received by each receiver of the slave apparatus, and transmit the weight of each transmitter of the slave apparatus to the control unit of the slave apparatus via the network cable.

(Supplementary note 8)

A radio communication method performed by one radio communication apparatus among a plurality of radio communication apparatuses, one of which becomes a master apparatus, and a rest of which become slave apparatuses, the radio communication apparatus including a plurality of transceivers each composed of a transmitter and a receiver, the radio communication method comprising connecting the radio communication apparatus to the slave apparatus via an RF (Radio Frequency) cable in a situation where the radio communication apparatus becomes the master apparatus;

connecting the radio communication apparatus to the master apparatus via the RF cable in a situation where the radio communication apparatus becomes the slave apparatus;

transmitting a transmission calibration signal from each transmitter to the master apparatus via the RF cable when transmission calibration is performed in a situation where the radio communication apparatus becomes the slave apparatus; and transmitting a reception calibration signal to each receiver of the slave apparatus via the RF cable when reception calibration is performed in a situation where the radio communication apparatus becomes the master apparatus.

(Supplementary Note 9)

The radio communication method according to Supplementary note 8, further comprising:

connecting the radio communication apparatus to the slave apparatus via a network cable in a situation where the radio communication apparatus becomes the master apparatus;

connecting the second port of the radio communication apparatus to the master apparatus via the network cable in a situation where the radio communication apparatus becomes the slave apparatus; and when the transmission calibration is performed in a situation where the radio communication apparatus becomes the master apparatus, receiving the transmission calibration signal transmitted from each transmitter of the slave apparatus via the RF cable, receiving the transmission calibration signal transmitted from each transmitter of the master apparatus, measuring a difference between an amplitude and a phase of the transmission calibration signal transmitted from each transmitter of the master apparatus and the slave apparatus and those of an original transmission calibration signal, calculating a weight of each transmitter of the master apparatus and the slave apparatus based on a result of the measurement, and transmitting the weight of each transmitter of the slave apparatus to the control unit of the slave apparatus via the network cable.

(Supplementary Note 10)

The radio communication method according to Supplementary note 9, further comprising:

transmitting the reception calibration signal to each receiver of the master apparatus when the reception calibration is performed in a situation where the radio communication apparatus becomes the master apparatus;

when the reception calibration is performed in a situation where the radio communication apparatus becomes the slave apparatus, measuring a difference between an amplitude and a phase of the reception calibration signal received by each receiver of the slave apparatus and those of an original reception signal and transmitting a result of the measurement to the master apparatus via the network cable; and when the reception calibration is performed in a situation where the radio communication apparatus becomes the master apparatus, measuring a difference between an amplitude and a phase of the reception calibration signal received by each receiver of the master apparatus and those of an original reception calibration signal, calculating a weight of each transmitter of the master apparatus and the slave apparatus based on a result of the measurement on the reception calibration signal received by each receiver of the master apparatus and the result of the measurement on the reception calibration signal received by each receiver of the slave apparatus, and transmitting the weight of each transmitter of the slave apparatus to the slave apparatus via the network cable.

(Supplementary Note 11)

A non-transitory computer readable medium storing a program for causing one radio communication apparatus among a plurality of radio communication apparatuses, one of which becoming a master apparatus, and a rest of which becoming slave apparatuses to execute a radio communication method, the radio communication apparatus including a plurality of transceivers each composed of a transmitter and a receiver, the program comprising:

a procedure of connecting the radio communication apparatus to the slave apparatus via an RF (Radio Frequency) cable in a situation where the radio communication apparatus becomes the master apparatus;

a procedure of connecting the radio communication apparatus to the master apparatus via the RF cable in a situation where the radio communication apparatus becomes the slave apparatus;

a procedure of transmitting a transmission calibration signal from each transmitter to the master apparatus via the RF cable when transmission calibration is performed in a situation where the radio communication apparatus becomes the slave apparatus; and a procedure of transmitting a reception calibration signal to each receiver of the slave apparatus via the RF cable when reception calibration is performed in a situation where the radio communication apparatus becomes the master apparatus.

This application is based upon and claims the benefit of priority from Japanese patent application No. 2018-045731, filed on Mar. 13, 2018, the disclosure of which is incorporated herein in its entirety by reference.

REFERENCE SIGNS LIST

10 OPTICAL TRANSCEIVER
20 BASEBAND UNIT
30 FRONTEND UNIT
31 TRANSCEIVER
32 TRANSMISSION AMPLIFIER
33 RECEPTION AMPLIFIER
34, 52, 54 SWITCH
40 ANTENNA
51 CALIBRATION TRANSCEIVER
53 DISTRIBUTION COMBINER
55 RF OUTPUT PORT
56 RF INPUT PORT
61 ETHERNET OUTPUT PORT
62 ETHERNET INPUT PORT
100 AAS
100-M MASTER AAS
100-S, 100-S1 TO 10-SL SLAVE AAS
200 HUB
300 HYBRID

The invention claimed is:

1. A radio communication system comprising:
a plurality of AASs (Active Antenna Systems), wherein one of the plurality of AASs becomes a master AAS, and a remainder of the AASs become slave AASs,
the master AAS and each of the slave AASs comprises:
 a plurality of transceivers each composed of a transmitter and a receiver; and
 a first port connected to a different AAS via an RF (Radio Frequency) cable,
the master AAS further comprises a calibration transceiver,
the first port of the master AAS is connected to the first port of the different AAS, which is one of the slave AASs, via the RF cable,
when transmission calibration is performed, each transmitter of the one of the slave AASs is configured to transmit a transmission calibration signal to the calibration transceiver of the master AAS via the RF cable, and
when reception calibration is performed, the calibration transceiver of the master AAS is configured to transmit a reception calibration signal to each receiver of the one of the slave AASs via the RF cable.

2. The radio communication system according to claim 1, wherein
the master AAS and each of the slave AASs further comprises:
 a second port connected to the different AAS via a network cable; and
 a control unit, wherein
 the second port of the master AAS is connected to the second port of the different AAS, which is the one of the slave AASs, via the network cable,
when transmission calibration is performed, the calibration transceiver of the master AAS is configured to receive the transmission calibration signal transmitted via the RF cable from each transmitter of the one of the slave AASs and receive the transmission calibration signal transmitted from each transmitter of the master AAS, and
the control unit of the master AAS is configured to, as a first measurement, measure a first difference between a first amplitude and a first phase of the transmission calibration signal transmitted from each transmitter of the master AAS and the one of the slave AASs and a second amplitude and a second phase of an original transmission calibration signal, calculate a first weight of each transmitter of the master AAS and the one of the slave AASs based on a first measurement result, and transmit the first weight of each transmitter of the one of the slave AASs to the control unit of the one of the slave AASs via the network cable.

3. The radio communication system according to claim 2, wherein when the reception calibration is performed,
the calibration transceiver of the master AAS is configured to transmit the reception calibration signal also to each receiver of the master AAS,
the control unit of the one of the slave AASs is configured to, as a second measurement, measure a second difference between a third amplitude and a third phase of the reception calibration signal received by each receiver of the one of the slave AASs and a fourth amplitude and a fourth phase of an original reception calibration signal and transmit a second measurement result to the control unit of the master AAS via the network cable, and
the control unit of the master AAS is configured to, as a third measurement, measure a third difference between a fifth amplitude and a fifth phase of the reception calibration signal received by each receiver of the master AAS and the fourth amplitude and the fourth phase of the original reception calibration signal, calculate a second weight of each receiver of the master AAS and the one of the slave AASs based on a third measurement result and the second measurement result, and transmit the second weight of each receiver of the slave AAS to the control unit of one of the slave AASs via the network cable.

4. The radio communication system according to claim 2, further comprising
a first distribution combiner; and
a second distribution combiner, wherein
when there are three or more of the AASs and a plurality of the slave AASs,
the first port of the master AAS is connected to the first distribution combiner via the RF cable, and the first port of each of the plurality of the slave AASs is connected to the first distribution combiner via the RF cable, and
the second port of the master AAS is connected to the second distribution combiner via the network cable, and the second port of each of the plurality of the slave AASs is connected to the second distribution combiner via the network cable.

5. An AAS (Active Antenna System) among a plurality of AASs, one of which becomes a master AAS, and a remainder of which become slave AASs, the AAS comprising:
a plurality of transceivers each composed of a transmitter and a receiver;
a first port connected to a different AAS via an RF (Radio Frequency) cable; and
a calibration transceiver, wherein
in a situation where the AAS becomes the master AAS, the first port of the AAS is connected to the first port of one of the slave AASs via the RF cable,
in a situation where the AAS becomes the one of the slave AASs, the first port of the AAS is connected to the first port of the master AAS via the RF cable, when transmission calibration is performed in a first situation where the AAS becomes the one of the slave AASs, each transmitter is configured to transmit a transmission calibration signal to the calibration transceiver of the master AAS via the RF cable, and when reception calibration is performed in a second situation where the AAS becomes the master AAS, the calibration transceiver is configured to transmit a reception calibration signal to each receiver of the one of the slave AASs via the RF cable.

6. The AAS according to claim 5, further comprising:
a second port connected to the different AAS via a network cable; and
a control unit, wherein
in a situation where the AAS becomes the master AAS, the second port of the AAS is connected to the second port of the one of the slave AASs via the network cable,
in a situation where the AAS becomes the one of the slave AASs, the second port of the AAS is connected to the second port of the master AAS via the network cable, and
when the transmission calibration is performed in the first situation where the AAS becomes the master AAS, the calibration transceiver is configured to receive the transmission calibration signal transmitted from each transmitter of the one of the slave AASs via the RF cable and receive the transmission calibration signal transmitted from each transmitter of the master AAS, the control unit is configured to, as a first measurement, measure a first difference between a first amplitude and a first phase of the transmission calibration signal transmitted from each transmitter of the master AAS and the one of the slave AASs and a second amplitude and a second phase of an original transmission calibration signal, calculate a first weight of each transmitter of the master AAS and the one of the slave AASs based on a first measurement result, and transmit the first weight of each transmitter of the one of the slave AASs to the control unit of the one of the slave AASs via the network cable.

7. The AAS according to claim 6, wherein
when the reception calibration is performed in the first situation where the AAS becomes the master AAS, the calibration transceiver is configured to transmit the reception calibration signal also to each receiver of the master AAS,
when the reception calibration is performed in the second situation where the AAS becomes the one of the slave AASs, the control unit is configured to, as a second measurement, measure a second difference between a third amplitude and a third phase of the reception calibration signal received by each receiver of the one of the slave AASs and a fourth amplitude and a fourth phase of an original reception calibration signal and transmit a second measurement result to the control unit of the master AAS via the network cable, and
when the reception calibration is performed in the first situation where the AAS becomes the master AAS, the control unit is configured to, as a third measurement, measure a difference between a fifth amplitude and a fifth phase of the reception calibration signal received by each receiver of the master AAS and the fourth amplitude and the fourth phase of the original reception calibration signal, calculate a second weight of each receiver of the master AAS and the one of the slave AASs based on a third measurement result and the second measurement result, and transmit the second weight of each receiver of the one of the slave AASs to the control unit of the slave AAS via the network cable.

8. A radio communication method performed by one AAS (Active Antenna System) among a plurality of AASs, one of which becomes a master AAS, and a remainder of which become slave AASs, the AAS including a plurality of transceivers each composed of a transmitter and a receiver, the radio communication method comprising:
connecting the AAS to one of the slave AASs via an RF (Radio Frequency) cable in a first situation where the AAS becomes the master AAS;
connecting the AAS to the master AAS via the RF cable in a second situation where the AAS becomes one of the slave AASs;
transmitting a transmission calibration signal from each transmitter to the master AAS via the RF cable when transmission calibration is performed in the second situation where the AAS becomes the one of the slave AASs; and
transmitting a reception calibration signal to each receiver of the one of the slave AASs via the RF cable when reception calibration is performed in the first situation where the AAS becomes the master AAS.

9. The radio communication method according to claim 8, further comprising:
connecting the AAS to the one of the slave AASs via a network cable in the first situation where the AAS becomes the master AAS;
connecting the AAS to the master AAS via the network cable in the second situation where the AAS becomes the one of the slave AASs; and
when the transmission calibration is performed in the first situation where the AAS becomes the master AAS, receiving the transmission calibration signal transmitted from each transmitter of the one of the slave AASs via the RF cable, receiving the transmission calibration signal transmitted from each transmitter of the master AAS, measuring, as a first measurement, a first difference between a first amplitude and a first phase of the transmission calibration signal transmitted from each transmitter of the master AAS and the one of the slave AASs and a second amplitude and a second phase of an original transmission calibration signal, calculating a first weight of each transmitter of the master AAS and the one of the slave AASs based on a first measurement result, and transmitting the first weight of each transmitter of the one of the slave AASs to the one of the slave AASs via the network cable.

10. A non-transitory computer readable medium storing a program for causing one AAS (Active Antenna System) among a plurality of AASs, one of which becomes a master AAS, and a remainder of which become slave AASs, to execute a radio communication method, the AAS including a plurality of transceivers each composed of a transmitter and a receiver, the radio communication method comprising:
connecting the AAS to one of the slave AASs via an RF (Radio Frequency) cable in a first situation where the AAS becomes the master AAS;
connecting the AAS to the master AAS via the RF cable in a second situation where the AAS becomes the one of the slave AASs;
transmitting a transmission calibration signal from each transmitter to the master AAS via the RF cable when transmission calibration is performed in the second situation where the AAS becomes the one of the slave AASs; and transmitting a reception calibration signal to each receiver of the one of the slave AASs via the RF cable when reception calibration is performed in the first situation where the AAS becomes the master AAS.

\* \* \* \* \*